United States Patent [19]

Ueda

[11] Patent Number: 4,939,055
[45] Date of Patent: Jul. 3, 1990

[54] PHOTOSENSITIVE MEMBER WITH BUTADIENE DERIVATIVE CHARGE TRANSPORT COMPOUND

[75] Inventor: Hideaki Ueda, Osaka, Japan
[73] Assignee: Minolta Camera Kabushiki Kaisha, Osaka, Japan
[21] Appl. No.: 282,061
[22] Filed: Dec. 9, 1988
[30] Foreign Application Priority Data Dec. 12, 1987 [JP] Japan .................. 62-315017

[51] Int. Cl.$^5$ .......................... G03G 5/06; G03G 5/14
[52] U.S. Cl. .......................... 430/59; 430/58; 430/78
[58] Field of Search .......................... 430/58, 59, 78

[56] References Cited

U.S. PATENT DOCUMENTS

| | | | |
|---|---|---|---|
| 4,241,157 | 12/1980 | Webster et al. | 430/78 X |
| 4,301,226 | 11/1981 | Contois et al. | 430/72 |
| 4,469,768 | 9/1984 | Horie et al. | 430/78 X |
| 4,487,824 | 12/1984 | Katagiri et al. | 430/58 |
| 4,594,303 | 6/1986 | Horie et al. | 430/78 X |
| 4,666,811 | 5/1987 | Bennett et al. | 430/74 |
| 4,839,252 | 6/1989 | Murata et al. | 430/59 |

FOREIGN PATENT DOCUMENTS 1010237 11/1965 United Kingdom .................. 430/78

Primary Examiner—Roland E. Martin
Attorney, Agent, or Firm—Burns, Doane, Swecker & Mathis

[57] ABSTRACT

The present invention provides a photosensitive member comprising a butadiene compound represented by the following general formula (I);

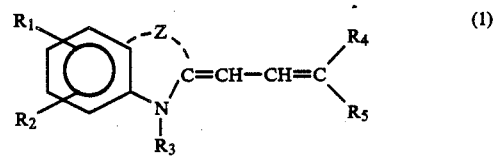

wherein Z is a residual group forming a five or a six membered ring together with carbon atom, nitrogen atom and a benzene ring; $R_1$ and $R_2$ represent hydrogen atom, halogen atom, an alkyl group or an alkoxy group respectively, $R_1$ and $R_2$ may form a benzene ring in combination with each other; $R_3$ is an alkyl group, an aralkyl group, or an aryl group, each of which may have a substituent; $R_4$ and $R_5$ represent an alkyl group, an aralkyl group, or an aryl group, each of which may have a substituent, $R_4$ and $R_5$ may form a ring in combination with each other, which is excellent in the stability of surface potential, the charge transporting ability, the sensitivity, the resistance to dark decay, the light fatigue resistance, the repetition properties thereof and so on.

17 Claims, 1 Drawing Sheet

PHOTOSENSITIVE MEMBER WITH BUTADIENE DERIVATIVE CHARGE TRANSPORT COMPOUND

BACKGROUND OF THE INVENTION

The present invention relates to a photosensitive member for electrophotography, and more particularly to an electrophotographic photosensitive member having a photoconductive layer which comprises a butadiene compound as a main component.

Widely known as photosensitive members for electrophotography are those of function-divided types comprising a charge generating layer and a charge transporting layer which are formed on or over an electrically conductive substrate, and those of dispersion types comprising a photoconductive layer formed on or over a substrate and prepared by dispersing charge generating particles in resin.

With the function-divided type, separated layers work dividedly to serve the basic functions of the photosensitive member, i.e. generation of charge carriers and transport of the charge carriers, to provide a photoconductive layer chargeable to a high surface potential and exhibiting great charge retentivity, high photosensitivity and stabilized repetition characteristics. Many compounds are known as charge generating materials and as charge transporting materials for use in the photosensitive members of the function-divided type. For example, various organic photoconductors of low molecular weight have been proposed for use in charge transporting layers. More specifically, U.S. Pat. No. 3,189,447 proposes use of 2,5-bis(p-diethylaminophenyl)-1,3,4-oxadiazole, but this compound has only a poor compatibility with binders and is liable to separate out as crystals. Further U.S. Pat. No. 3,820,989 discloses use of diarylalkane derivatives having a high compatibility with binders. However, the photosensitive member containing the derivatives undergoes variations in sensitivity when repeatedly used, and is still required to be improved in initial sensitivity and residual potential characteristics, as well as in sensitivity variations and durability for repeated use. Japanese Patent Kokai No. 210364/1986 discloses photoconductive materials represented by the following formula;

but the photoconductive materials are different from those disclosed in the present invention.

SUMMARY OF THE INVENTION

The main objects of the present invention are to improve the foregoing drawbacks of the prior arts and to provide an electrophotographic photosensitive member having a high photosensitivity and stable electrophotographic characteristics even at repeated use.

The present invention provides an electrophotographic photosensitive member comprising a butadiene compound represented by the following formula (I);

wherein Z is a residual group forming a five or a six membered ring together with carbon atom, nitrogen atom and a benzene ring; $R_1$ and $R_2$ represent hydrogen atom, halogen atom, an alkyl group or an alkoxy group respectively, $R_1$ and $R_2$ may form a benzene ring in combination with each other; $R_3$ is an alkyl group, an aralkyl group, or an aryl group, each of which may have a substituent; $R_4$ and $R_5$ represent an alkyl group, an aralkyl group, or an aryl group, each of which may have a substituent, $R_4$ and $R_5$ may form a ring in combination with each other.

Further stated more specially, the butadiene compound of the formula (I) is incorporated in the charge transporting layer when the photosensitive member is of the laminated function-divided type or in the photoconductive layer when the photosensitive member is of the single-layer dispersion type, to give excellent coating properties, excellent photographic properties such as charge-keeping ability, sensitivity and residual potential, and suppress light fatigue even when repeatedly used.

DETAILED DESCRIPTION OF THE INVENTION

The present invention provides an electrophotographic photosensitive member comprising a butadiene compound represented by the following formula (I);

wherein Z is a residual group forming a five or a six membered ring together with carbon atom, nitrogen atom and a benzene ring; $R_1$ and $R_2$ represent hydrogen atom, halogen atom, an alkyl group or an alkoxy group respectively, $R_1$ and $R_2$ may form a benzene ring in combination with each other; $R_3$ is an alkyl group, an aralkyl group, or an aryl group, each of which may have a substituent; $R_4$ and $R_5$ represent an alkyl group, an aralkyl group, or an aryl group, each of which may have a substituent, $R_4$ and $R_5$ may form a ring in combination with each other.

In the general formula (I), Z is a residual group forming a five or a six membered ring together with carbon atom, nitrogen atom and a benzene ring. Such a five membered ring is exemplified by ; such a six membered ring is exemplified by

; and the benzene ring may have halogen atom or an alkyl group such as methyl and ethyl.

$R_1$ and $R_2$ represent hydrogen atom, halogen atom, an alkyl group (such as methyl, ethyl, propyl, butyl and pentyl) or an alkoxy group (such as methoxy, ethoxy, propoxy and butoxy) respectively, $R_1$ and $R_2$ may form a benzene ring in combination with each other.

$R_3$ represents an alkyl group (such as methyl, ethyl, propyl, butyl and pentyl), an aralkyl group (such as benzyl, phenethyl, methyl benzyl and methoxy benzyl), or an aryl group (such as phenyl, methylphenyl, methoxyphenyl, and naphthyl). These groups may have a substituent such as an alkyl group (methyl, ethyl, propyl and so on), an alkoxy group (methoxy, ethoxy, propoxy, butoxy and so on) or halogen atom.

$R_4$ and $R_5$ represent an alkyl group, an aralkyl group, or an aryl group respectively, each of which may have a substituent, $R_4$ and $R_5$ may form a ring in combination with each other. An alkyl group is exemplified by methyl, ethyl, propyl, isopropyl, butyl, isobutyl, t-butyl, pentyl and so on; An aralkyl group is exemplified by benzyl, phenethyl, methylbenzyl, methoxybenzyl, chlorobenzyl and so on; an aryl group is exemplified by phenyl, naphthyl, methly phenyl, methoxyphenyl, anthranyl and so on. The alkyl group, the aralkyl group or the aryl group may have a substituent such as an alkyl group (methyl, ethyl, propyl, butyl and so on), an alkoxy group (methoxy, ethoxy, propoxy, butoxy and so on) a dialkyl substituted amino group (dimethyl amino group, diethyl amino group, dipropyl amino group dibutyl amino group and so on). $R_4$ and $R_5$ may form a ring in combination with each other as exemplified by (fluorene)

(dihydronaphthalene)

(indane)

(indene)

(tetralin)

(dihydroanthracene)

Examples of preferred butadiene compounds of the present invention represented by the formulae (I) are those having the following structural formula. These examples are in no way limitative.

[1]

[2]

[3]

[10]

[4]

[11]

[5]

[12]

[6]

[13]

[7]

[14]

[8]

[15]

[9]

[16]

-continued

[43]

The butadiene compound represented by the formula (I) is prepared, for example, by condensing a phosphorus compound represented by the formula (II);

(II)

wherein $R_4$, and $R_5$ are as defined in the formula (I), and $R_6$, $R_7$ are each alkyl, cycloalkyl, aralkyl or aryl which forms a phosphonium salt, with an aldehyde compound represented by the formula (III)

(III)

wherein $Z$ $R_1$ $R_2$ and $R_3$ are as defined in the formula (I).

Preferably, each of $R_6$ and $R_7$ in the formula (II) representing the phosphorus compound is cyclohexyl, benzyl, phenyl, or lower alkyl.

Examples of reaction solvents useful for the foregoing process are hydrocarbons, alcohols and ethers, such as methanol, ethanol, isopropanol, butanol, 2-methoxyethanol, 1,2-dimethoxyethane, bis(2-methoxyethyl) ether, dioxane, tetrahydrofuran, toluene, xylene, dimethyl sulfoxide, N,N-dimethylformamide, N-methylpyrrolidone, 1,3-dimethyl-2-imidazolizinone, etc. Among these solvents, polar solvents such as N,N-dimethylformamide and dimethyl sulfoxide are especially preferable.

Examples of useful condensing agents are sodium hydroxide, potassium hydoroxide, sodium amide, sodium hydride, and alcoholates such as sodium, methylate, potassium-t-butoxide, etc.

The reaction temperature can be selected from a wide range of from about 0° C. to about 100° C. and is preferably 10° C. to 80° C.

Alternatively, the butadiene compound to be used in the invention can be prepared from a corresponding quaternary phosphonium salt, such as triphenylphosphonium salt, in place of the phosphorus compound of the formula (II), via phosphorylene obtained by the Witting process and by the condensation of this compound with an aldehyde compound of the formula (III).

FIGS. 1 to 5 schematically show examples of electrophotographic photosensitive members prepared with use of the butadiene compound of the invention.

Figure 1:
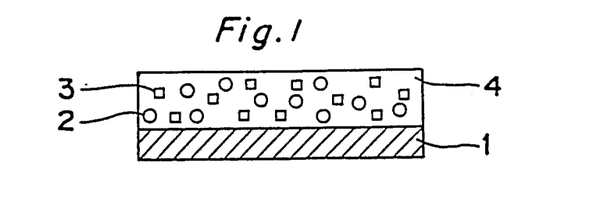
FIG. 1 is a diagram showing the structure of a dispersion-type photosensitive member embodying the invention comprising a photoconductive layer formed on an electrically conductive substrate.

FIG. 1 shows a photosensitive member comprising a photoconductive layer 4 formed on a substrate 1 and prepared from a charge generating material 3 and a charge transporting material 2 as admixed with a binder. The butadiene compound of the invention is used as the charge transporting material.

Figure 2:
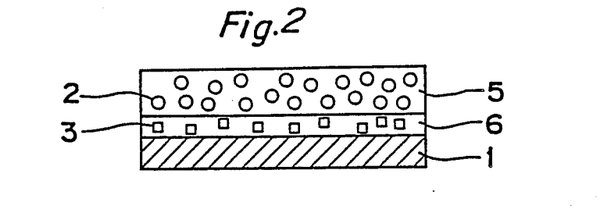
FIG. 2 is a diagram showing the structure of a photosensitive member of the function-divided type comprising a charge generating layer and a charge transporting layer which are formed on an electrically conductive substrate.

FIG. 2 shows a photosensitive member of the function-divided type comprising a charge generating layer 6 and a charge transporting layer 5 which are combined to serve as a photoconductive layer. The charge transporting layer 5 is formed on the surface of the charge generating layer 6. The butadiene compound of the invention is incorporated in the charge transporting layer 5.

Figure 3:
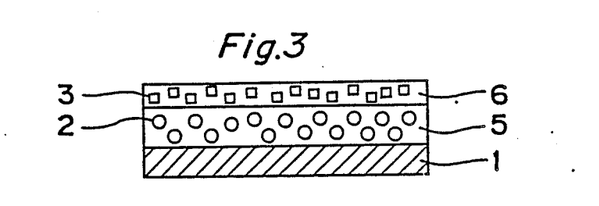
FIG. 3 is a diagram showing the structure of a member of another photosensitive member of the function-divided type comprising a charge generating layer and a charge transporting layer which are formed on an electrically conductive substrate.

FIG. 3 shows another photosensitive member of the function-divided type which, like the one shown in FIG. 2, comprises a charge generating layer 6 and a charge transporting layer 5. In converse relation to the member shown in FIG. 2, the charge generating layer 6 is formed on the surface of the charge transporting layer 5.

Figures 4, 5:
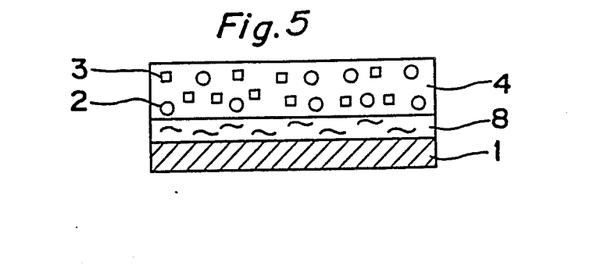
FIG. 4 is a diagram showing the structure of another dispersion-type photosensitive member comprising a photoconductive layer and a surface protective layer formed on an electrically conductive substrate.
FIG. 5 is a diagram showing the structure of another dispersion-type photosensitive member comprising a photoconductive layer and an intermediate layer formed on an electrically conductive substrate.

The member shown in FIG. 4 comprises the one shown in FIG. 1 and a surface protective layer 7 formed on the surface of the photoconductive layer 4. The photoconductive layer 4 may be separated into a charge generating layer 6 and a charge transporting layer 5 to provide a photosensitive member of the function-divided type.

FIG. 5 shows a photosensitive member having the same construction as the one shown in FIG. 1 except that an intermediate layer 8 is interposed between the substrate 1 and the photoconductive layer 4. The intermediate layer 8 serves to give enhanced adhesion, afford improved coatability, protect the substrate and assure injection of charges from the substrate into the photoconductive layer with improved effectiveness. Polyimide resin, polyester resin, polyvinyl butyral resin, casein, etc. are useful for forming the intermediate layer. The photoconductive layer of the member may also be modified to the function divided type.

The photosensitive member of the present invention for use in electrophotography can be prepared by dissolving or dispersing a butadiene compound of the formula (I) and a binder in a suitable solvent to obtain a coating composition, applying the composition to an electrically conductive substrate and drying the coating. When required, a photoconductive material and an electron-attracting compound, or a sensitizing dye and other pigments can be admixed with the coating composition. The dried coating, i.e. photosensitive layer, is usually 5 to 30 μm, preferably 6 to 20 μm, in thickness.

Suitable solvents for use in the preparation of the composition are exemplified by aliphatic hydrocarbon halide such as carbon tetrachloride, dichloromethane, dichloroethane, dichloropropane, chloroform, trichloroethane; ketones such as cyclohexanone, methyl ethyl ketone, methyl isobutyl ketone, 2-methoxy-2-cyclopentanone; cyclic ethers such as dioxan, tetrahydrofuran, dioxolan, 4-methyl dioxolan, dimethyl dioxan; and a mixture thereof.

A butadiene compound of the invention has excellent dissolution properties in the above-mentioned solvent, and it results well in coatability and photosensitivity.

A butadiene compound of the invention has also good compatibility with a binder resin, and it results well in photosensitivity.

More specifically, the photosensitive member of the function-divided type having the same structure as the member of FIG. 2 described, i.e. having a charge generating layer formed on an electrically conductive substrate and a charge transporting layer on the charge generating layer, can be prepared by coating the substrate with a charge generating material by vacuum deposirion or by coating the substrate with a composition obtained by dispersing the material in a suitable solvent which may contain a binder resin dissolved therein when so required and drying the coating, to form the charge generating layer, and further coating this layer with a solution of the butadiene compound serving as a charge transporting material and binder resin in a suitable solvent. When a charge generating layer is formed by vacuum deposition, phthalocyanines, for example, such as metal-free phthalocyanine, titanyl phthalocyanine, aluminium chlorophthalocyanine are used. When a charge generating layer is formed by dispersion method, bisazo pigments, for example, are used.

The charge generating layer thus formed is 4 $\mu$m or less, preferably 2 $\mu$m or less in thickness, while the charge transporting layer is 3 to 30 $\mu$m, preferably 5 to 20 $\mu$m, in thickness. It is suitable that the charge transporting layer contains the butadiene compound in an amount of 0.02 to 2 parts by weight, more suitably 0.03 to 1.3 parts by weight, per one part by weight of the binder resin. The butadiene compound may be used in combination with some other charge transporting materials. When this material is a high-molecular-weight charge transporting material which itself is serviceable as a binder, the other binder can be dispensed with. The photosensitive member, like the one shown in FIG. 3, may be so constructed that the charge transporting layer is provided on the electrically conductive substrate, with the charge generating layer formed on the charge transporting layer.

The photosensitive member of the dispersion type having the same structure as the member of FIG. 1 described, i.e. having a photoconductive layer on an electrically conductive substrate, is prepared by dispersing a finely divided charge generating material in a solution of the butadiene compound and a binder resin, coating the conductive substrate with the dispersion and drying the coating to form the photoconductive layer. The photoconductive layer thus formed is 3 to 30 $\mu$m, preferably 5 to 20 $\mu$m, in thickness. If the charge generating material is used in too small an amount, lower sensitivity will result, whereas presence of an excess of the material leads to impaired chargeability or gives reduced strength to the photoconductive layer. It is desirable that the photoconductive layer contains the charge generating material in an amount of 0.01 to 2 parts by weight, more desirably 0.05 to 1 part by weight, per one part by weight of the binder resin. The amount of butadiene compound is preferably 0.01 to 2 parts by weight, more preferably 0.02 to 1.2 parts by weight, per one part by weight of the binder resin. The butadiene compound may be used conjointly with a high-molecular-weight a charge generating material, such as polyvinylcarbazole, which is serviceable as a binder in itself, or with some other charge transporting material such as hydrazone.

Example of charge generating materials useful for the present photosensitive member of the function-divided type and the dispersion-type are organic substances such a as bisazo pigments, triarylmethane dyes, thiazine dyes, oxazine dyes, xanthene dyes, cyanine coloring agents, styryl coloring agents, pyrylium dyes, azo pigments, quinacridone pigments, indigo pigments, perylene pigments, polycyclic quinone pigments, bisbenzimidazole pigments, indanthrone pigments, squalylium pigments and phthalocyanine pigments; and inorganic substances such as selenium, selenium-tellurium, selenium-arsenic, cadmium sulfide and amorphous silicon. Any other material is also usable insofar as it generates charge carriers very efficiently upon absorption of light.

The binder to be used is any of known thermoplastic resins or thermosetting resins having electrically insulating properties, light-curable resins and photoconductive resins. Although not limitative, examples of suitable binders are thermoplastic binders such as saturated polyester resin, polyamide resin, acrylic resin, ethylene-vinyl acetate copolymer, ion-crosslinked olefin copolymer (ionomer), styrene-butadiene block copolymer, polyallylate, polycarbonate, vinyl chloride-vinyl acetate copolymer, cellulose ester, polyimide and styrol resin; thermosetting binders such as epoxy resin, urethane resin, silicone resin, phenolic resin, melamine resin, xylene resin, alkyd resin and thermosetting acrylic resin; light-curable resins; photoconductive resins such as poly-N-vinylcarbazole, polyvinylpyrene and polyvinylanthracene; etc. These binders are usable singly or in admixture. The electrically insulating resin is preferably at least $1 \times 10^{12}$ ohm-cm in volume resistivity. More preferable among the foregoing examples are polyester resin, polycarbonate and acrylic resin.

In preparing electrophtographic photosensitive media according to the present invention, the binder may be used conjointly with plasticizers such as paraffin halide, polybipheyl chloride, dimethylnaphthalene, dibutyl phthalate and o-terphenyl; election-attracting sensitizers such as chloranil, tetracyanoethylene, 2,4,7-trinitro-9-fluorenone, 5,6-dicyanobenzoquinone, tetracyanoquinodimethane, tetrachloroacetic anhydride and 3,5,-dinitrobenzoic acid; and sensitizers such as Methyl Violet, Rhodamine B, cyanine dye, pyrylium salt and thiapyrylium salt.

The photosensitive member thus prepared for use in electrophotography may have an adhesion or intermediate layer, or a surface protective layer when so required as already stated with reference to FIGS. 4 or 5.

An intermediate layer is formed with polymer itself such as polyimide, polyamide, nitrocellulose, polyvinylbutyral, polyvinylalcohol, or formed by dispersing materials with low electrical resistance such as tin oxide or indium oxide, or by depositing aluminium oxide, zinc oxide, silicon oxide and so on.

The desirable thickness of an intermediate layer is 1 $\mu$m or less.

It is suitable that a surface protective layer is formed with polymer itself such as acrylic resin, polyaryl resin, polycarbonate resin, urethane resin, or formed by dispersing materials with low electrical resistance such as tin oxide cr indium oxide. An organic plasma-polymerized polymer layer may be applied to the surface protective layer. The organic plasma-polymerized polymer layer, if necessary, may incorporate oxygen, halogen, atoms of the group III in the periodic table, or atoms of the group V in the periodic table. The desirable thickness of a surface protective layer is 5 $\mu$m or less.

As described above, the butadiene compound of the present invention is easy to prepare, can be incorporated into photosensitive member of the function-divided type or dispersion type and is usable in combination with various charge generating materials and binder resins, or conjointly with other charge transport- ing materials in some cases. Accordingly, the electrophotographic photosensctive member having the present butadiene compound incorporated therein is very easy to produce, finds wide use, has outstanding repetition characteristics with light fatigue effectively prevented by the butadiene compound, exhibits improved sensitivity and is diminished in surface potential variations.

SYNTHESIS EXAMPLE (COMPOUND (3))

|  | C (%) | H (%) | N (%) |
|---|---|---|---|
| Calcd. | 88.89 | 7.12 | 3.99 |
| Found. | 88.92 | 7.14 | 3.95 |

EXAMPLE 1

The bisazo compound represented by the following formula (A);

The phosphonate compound represented by the following formula;

of 3.04 g and the aldehyde compound represented by the following formula;

of 2.01 g were dissolved in 30 ml of dimethylformamide under nitrogen atomosphere. The solution is heated to 30°–40° C. and titrated with the suspension solution of 5 g of potassium-ter-butoxide in 60 ml of dimethylformamide. Then, the solution was stirred for 8 hours at room temperature, followed by being left alone overnight. The obtained mixture was added into ice-water of 900 ml, and neutralized with dilute hydrochloric acid. After about 30 minutes, deposited crystals were filtered. The filtered products was washed with water and recrystalized in acetonitrile-hexane for the purification to afford 3.1 g of yellow needle crystals (88% of yield).

The purified product was subjected to elementary analysis with the following result.

of 0.45 part by weight and 0.45 part by weight of polyester resin (Vylon 200 made by Toyobo K.K.) and 50 parts by weight of cyclohexanone were taken in Sand grinder for dispersion. The dispersion solution of the bisazo pigment was applied onto aluminotype-Mylar of 100 μm in thickness by a film applicator to form a charge generating layer so that a thickness of the layer after dried might be 0.3 g/m². A solution of 70 parts of the butadiene compound (3) and 70 parts of polycarbonate resin (K-1300; made by Teijin Kasei K.K.) dissolved in 400 parts of 1,4-dioxane was applied onto the above formed charge generating layer to form a charge transporting layer so that the thickness of the layer after dried might be 16 μm. Thus, a photosensitive member with the two layers was prepared.

The photosensitive member thus prepared was incorporated into a commercial electrophotographic copying machine (EP-470Z, product of Minolta Camera K.K.) and tested with application of a voltage of −6 Kv to the d.c. power supply to measure the initial surface potential Vo (V), the amount of exposure required for Vo to reduce to half of $V_o$ ($E_{\frac{1}{2}}$(lux·sec)), and the potential decay rate $DDR_1$ (%) when the member was allowed to stand in the dark for 1 second after charging.

EXAMPLES 2–4

Photosensitive members were prepared with the same structure and in a similar way as Example 1 except that the butadiene compound (4), (5), (6), for the charge transporting layer were used respectively instead of the butadiene compound (3). The photosensitive members thus obtained were rested in the same inner as in Example 1 to measure Vo, $E_{\frac{1}{2}}$, and $DDR_1$.

EXAMPLE 5

The bisazo compound represented by the following formula (B);

of 0.45 part by weight and 0.45 part by weight of polystyrene resin (40000 of molecular weight) and 50 parts by weight of cyclohexanone were taken in Sand grinder for dispersion. The dispersion solution of the bisazo compound was applied onto aluminotype-Mylar of 100 μm in thickness by a film applicator to form a charge generating layer so that a thickness of the layer after dried might be 0.3 g/m². A solution of 70 parts of the butadiene compound (7) and 70 parrs of polyallylate resin (U-100; Yunichika K.K.) dissolved in 400 parts of 1,4-dioxane was applied onto the above formed charge generating layer to form a charge transporting layer so that the thickness of the layer after dried might be 16 μm. Thus, a photosensitive member with the two layers was prepared.

The photosensitive member thus obtained was tested in the same manner as Example 1 to measure $V_o$, $E_{\frac{1}{2}}$, and $DDR_1$.

EXAMPLES 6-8

Photosensitive members were prepared with the same structure and in a similar way as Example 5 except that the butadiene compounds (9) (11) and (14) for the charge transporting layer were used respectively instead of the styryl compound (7). The photosensitive members thus obtained in Example 6-8 were tested in the same manner as in Example 1 to measure $V_o$, $E_{\frac{1}{2}}$, and $DDR_1$.

EXAMPLE 9

Copper phthalocyanine (50 parts) and 0.2 parts tetranitro copper phthalocyanine were dissolved in 500 parts of 98% concentrated sulfuric acid with full stirring. The solution was placed into 5000 parts of water to cause a photoconductive composition of copper phthalocyanine and tetranitro copper phthalocyanine to separate out, followed by filtration, washing with warer and drying in a vacuum at 120° C.

The resulting composition (10 parts), 22.5 parts of thermosetting acrylic resin (Acrydic A 405, product of Dainippon Ink K.K.), 7.5 parts of melamine resin (Super Beckamine J820, product of Dainippon Ink K.K.) and 15 parts of butadiene compound (3) were placed into a ball mill pot along with 100 parts of a solvent mixture of methyl ethyl ketone and xylene in equal amounts. These ingredients were treated for 48 hours for dispersion to obtain a photosensitive coating composition, which was then applied to an aluminum substrate and dried to obtain a coating, about 15 μm in thickness, whereby a photosensitive member was prepared.

The Vo, $E_{\frac{1}{2}}$, and $DDR_1$ values of the photosensitive members thus obtained were measured in the same manner as in Example 1 except that the voltage applied to the d.c. power supply was +6 kV.

EXAMPLES 10-12

Photosensitive members were prepared with the same structure and in a similar way as Example 9 except that the butadiene compound (23), (24) and (25) for the charge transporting layer were used respectively instead of the styryl compound (3).

The Vo, $E_{\frac{1}{2}}$, and $DDR_1$ values of the photosensitive members thus obtained were measured in the same manner as in Example 9.

COMPARATIVE EXAMPLES 1-4

Photosensitive members were prepared with the same structure and in a similar way as the member of Example 9 except that the compounds of the formulas (C), (D), E) and (F) given below were respectively used for the charge transporting layer in place of the butadiene compound (3).

The Vo, $E_{\frac{1}{2}}$, $DDR_1$ and $V_R$ values of the photosensitive members and thus obtained were measured in the same manner as in Example 9.

COMPARATIVE EXAMPLES 5-8

Photosensitive members were prepared with the same structure and in a similar way as the member of Example 9 except that the compounds of the formulae (G), (H), (I) and (J) given below were respectively used for the charge transporting layer in place of the butadiene compound (3).

(G) benzothiazole-CH=CH-C6H4-N(C2H5)2

(H) C6H5-CH=CH-C6H4-N(C2H5)2

(I) (C6H5)2N-C6H4-CH=CH-C6H4-OCH3

(J) 3,3-dimethyl-1-methylindoline-C=CH-CH=CH-C6H4-OCH3

The Vo, E$_\frac{1}{2}$, and DDR$_1$ values of the photosensitive members thus prepared were measured in the same manner as in Example 9.

COMPARATIVE EXAMPLES 9-11

Photosensitive members were prepared with the same structure and in a similar way as the member of Example 9 except that the compounds of the formulas (K), (L), and (M) given below were respectively used for the charge transporting layer in place of the butadiene compound (3).

(K) 3,3-dimethyl-1-methylindoline-C=CH-CH=CH-C6H5

(L) C6H5-CH=CH-CH=CH-C6H4-N(C2H5)2

(M) (CH3-C6H4)(C6H5)C=CH-CH=C(C6H5)2

The Vo, E$_\frac{1}{2}$, and DDR$_1$ values of the photosensitive members thus prepared were measured in the same manner as in Example 9.

The results of Vo, E$_\frac{1}{2}$, DDR$_1$ of photosensitive members obtained in Examples 1-12, Comparative Examples 1-11 were summarized in Table 1.

By the way, crystals deposited at the preparations of photosensitive members in Comparative Examples 1, 2, 5, 7, 9, 10 and 11 because dissolution propertres to solvent and resin were poor.

TABLE 1

| | Vo (V) | E$_\frac{1}{2}$ (lux · sec) | DDR$_1$ (%) |
|---|---|---|---|
| Example | | | |
| 1 | −650 | 1.9 | 3.5 |
| 2 | −660 | 1.8 | 2.8 |
| 3 | −650 | 1.9 | 3.2 |
| 4 | −660 | 2.1 | 3.0 |
| 5 | −660 | 2.5 | 2.9 |
| 6 | −640 | 2.1 | 3.8 |
| 7 | −650 | 2.6 | 3.2 |
| 8 | −640 | 2.4 | 4.0 |
| 9 | +620 | 1.7 | 12.4 |
| 10 | +610 | 1.5 | 13.5 |
| 11 | +610 | 1.9 | 13.2 |
| 12 | +620 | 2.2 | 12.7 |
| Comparative Example | | | |
| 1 | +620 | 36.0 | 6.5 |
| 2 | +600 | 5.7 | 14.0 |
| 3 | +610 | 8.3 | 13.0 |
| 4 | +600 | 3.2 | 14.3 |
| 5 | +620 | 15.0 | 12.0 |
| 6 | +610 | 12.8 | 10.8 |
| 7 | +600 | 6.5 | 13.7 |
| 8 | +610 | 8.4 | 12.4 |
| 9 | +640 | 12.5 | 10.0 |
| 10 | +610 | 9.4 | 11.0 |
| 11 | +700 | 21.0 | 8.5 |

It was understood clearly from Table 1 that a photosensitive member of the invention, even if being a laminated type or a monolayer type, sufficient charge-keeping ability, enough small potential decay rate to be used practically and excellent sensitivity.

Further, the photosensitive member in Example 9 was installed in a commercial photographic copying machine (EP-350Z; made by Minolta Camera K.K.) and subjected to practical developing test repeatedly by charging it positively. It was understood that a photosensitive member of the invention was excellent in repetition properties because even after one thousand sheets of paper were developed, the photosensitive member in Example 9 showed excellent gradient properties at both initial stage and final stage of the test, no sensitivity change and clear images.

What is claimed is:

1. A photosensitive member with a charge generating layer and a charge transporting layer laminated on or over an electrically conductive substrate, wherein the charge transporting layer comprises a binder resin and a butadiene compound of the following general formula $$Y=CH-CH=C\diagup^{A_1}_{\diagdown A_2} \quad [I]$$

$$Y=CH-CH=Z \quad [II]$$

wherein Y is a divalent group derived from a heterocyclic ring and is a compound of one of the formulas;

R₁ and R₂ are independently a hydrogen atom, a halogen atom, an alkyl group or an alkoxy group, R₁ and R₂ may form a benzene ring in combination with each other; R₃ is an alkyl group, an aralkyl group or an aryl group, each of which may have a substituent; R₄ and R₅ are independently a hydrogen atom or an alkyl group; A₁ and A₂ are independent an alkyl group, an aralkyl group, or an aryl group, each of which may have a substituent, and Z is a divalent group derived from a hydrocarbon ring and is a compound of one of the formulas;

2. A photosensitive member of claim 1, wherein the charge generating layer comprises an azo compound.

3. A photosensitive member of claim 1, wherein the charge transporting layer comprises the butadiene compound of the general formula or dispersed in the binder resin.

4. A photosensitive member of claim 3, wherein the charge transporting layer comprises the butadiene compound of the general formula or at the content of 0.02–2 parts by weight on the basis on the binder resin of 1 part by weight.

5. A photosensitive member of claim 2, wherein an intermediate layer is formed on the electrically conductive substrate.

6. A photosensitive member of claim 1 further comprises a surface protective layer.

7. A photosensitive member with a photoconductive layer formed on or over an electrically conductive substrate, wherein the photoconductive layer comprises a binder resin, a charge generating material and a butadiene compound as a charge transporting material of the general formula or;

wherein Y is a divalent group derived from a heterocyclic ring and is a compound of one of the formulas;

R₁ and R₂ are independently a hydrogen atom, a halogen atom, an alkyl group or an alkoxy group, R₁ and R₂ may form a benzene ring in combination with each other; R₃ is an alkyl group, an aralkyl group or an aryl group, each of which may have a substituent; R₄ and R₅ are independently a hydrogen atom or an alkyl group; A₁ and A₂ are independently an alkyl group, an aralkyl group, or an aryl group, each of which may have a substituent, and Z is a divalent group derived from a hydrocarbon ring and is a compound of one of the formulas;

8. A photosensitive member of claim 7, wherein the charge generating material is a phthalocyanine pigment.

9. A photosensitive member of claim 7, wherein the photoconductive layer comprises the charge generating material at the content of 0.01–2 parts by weight on the basis of the binder resin of 1 part by weight.

10. A photosensitive member of claim 7, wherein the photoconductive layer comprises the butadiene compound of the formula or at the content of 0.01–2 parts by weight on the basis of the binder resin of 1 part by weight.

11. A photosensitive member of claim 7, wherein an intermediate layer is formed on the electrically conductive substrate.

12. A photosensitive member of claim 7, further comprises a surface protective layer.

13. A photosensitive member of claim 1, wherein the charge generating layer is 4 μm or less in thickness.

14. A photosensitive member of claim 1, wherein the charge transporting layer is 3–30 μm in thickness.

15. A photosensitive member of claim 6, wherein the surface protective layer comprises an organic plasma-polymerized polymer layer.

16. A photosensitive member of claim 7, wherein the photoconductive layer is 3–30 μm in thickness.

17. A photosensitive member of claim 12, wherein the surface protective layer comprises an organic plasma-polymerized polymer layer.

* * * * *